United States Patent [19]

Sluiman et al.

[11] Patent Number: 6,098,072
[45] Date of Patent: Aug. 1, 2000

[54] SOURCE CODE FILES IN A FILE DIRECTORY SYSTEM HAVING MULTIPLE HIERARCHIES REPRESENTING CONTEXTUAL VIEWS

[75] Inventors: Harm Sluiman, Scarborough; Michael Starkey, North York, both of Canada

[73] Assignee: International Business Machines Corporation, Armonk, N.Y.

[21] Appl. No.: 08/956,415

[22] Filed: Oct. 23, 1997

[30] Foreign Application Priority Data

Mar. 27, 1997 [CA] Canada ................................. 2201276

[51] Int. Cl.[7] ........................................... G06F 17/30
[52] U.S. Cl. ..................... 707/103; 707/100; 707/102; 707/514; 707/907
[58] Field of Search ............................ 707/1, 2, 3, 4, 707/5, 6, 8, 10, 100, 101, 102, 103, 104, 200, 202, 203, 204, 205, 501, 511, 513, 514, 530, 907; 395/707, 709, 712; 345/355, 427

[56] References Cited

U.S. PATENT DOCUMENTS

| | | | |
|---|---|---|---|
| 5,072,412 | 12/1991 | Henderson, Jr. et al. | 345/346 |
| 5,187,786 | 2/1993 | Densmore et al. | 707/3 |
| 5,274,803 | 12/1993 | Dubin et al. | 707/10 |
| 5,388,196 | 2/1995 | Pajak et al. | 345/329 |
| 5,701,137 | 12/1997 | Kiernan et al. | 345/340 |
| 5,706,510 | 1/1998 | Burgoon | 707/203 |
| 5,740,445 | 4/1998 | Okuda | 395/707 |
| 5,832,275 | 11/1998 | Olds | 395/712 |

*Primary Examiner*—Wayne Amsbury
*Assistant Examiner*—Srirama Channavajjala
*Attorney, Agent, or Firm*—Whitham, Curtis & Whitham; Jay P. Sbrollini

[57] ABSTRACT

The invention provides a technique for managing multiple contextual views of source code files. In a file system, different tasks demand that source code files be grouped in different hierarchical directories. When some or all of this manipulation is of the physical files themselves, the directories can become confused, and it may be difficult for the next user to access needed source code files. In the technique of the invention, the physical location of the files is independent of all contextual views, and is maintained in a separate viewable hierarchy. All items in contextual view hierarchies contain only references to the physical location of the source code files, and so modifications of those items, such as delete, move and copy, only alter the references themselves. A separate set of operations can be used for explicitly maintaining or modifying the physical source code files.

9 Claims, 3 Drawing Sheets

SOURCE CODE FILES IN A FILE DIRECTORY SYSTEM HAVING MULTIPLE HIERARCHIES REPRESENTING CONTEXTUAL VIEWS

RELATED APPLICATIONS

Application for the present invention is filed concurrently with application titles "An Object Oriented Framework Mechanism Providing Common Object Relationship and context Management for Multiple Tools" (IBM Docket No. CA997-002, Ser. No. 08/950,117 in pending) and "Hierarchical Metadata Store For an Integrated Development Environment" (IBM Docket No. CA997-003, Ser. No. 08/956,413 in pending), which are commonly assigned.

BACKGROUND OF THE INVENTION

1. Field of the Invention

The present invention generally relates to information handling systems, and in particular, to a general use software management technique.

2. Background Description

Applications usually consist of a number of independent source files maintained in a file system. Software developers can work with the source code contained in these in a number of ways. A source code segment can be edited as part of a larger coding effort, and/or compiled into an executable or even into several different executables. Thus, a single source file can be used in several contexts, and any of these context can also be part of a body of multiple overlapping contexts.

However, the single source file physically exists in only one location.

When developing software, one of the first tasks of the developer or manager is often to determine the nature and location of the source file contents in the application being used. This is frequently done by using disk directories, on an ad hoc basis, as an organizational vehicle. Some common examples are directory structures to reflect project builds or makes, directory structures to reflect source version hierarchies, and project and department organizations.

The content of a request may require a change in the containment hierarchies of the directory structure. Therefore, a common approach is to initially organize the directories for the most frequently-used context, and devise dedicated software "tools" to copy or rearrange the directories to support the context required by other task demands, as they arise.

Some file systems provide mechanisms for creating "shadow objects" copies of the original source files, and hierarchies. These are then maintained as file system directories in the ordinary manner.

All of this leaves the structure of the source files and the directories in various states typically understood only by the user that organized it. Often this is simply the last requester.

As the complexity and/or size of a project grows, this problem becomes more of an exposure. Steps must be taken to correct it, but there is currently no known management system providing a flexible point of control, particularly over directory structures that have become standardized and unchangeable.

SUMMARY OF THE INVENTION

It is therefore an object of the present invention to provide a management system to separate the different hierarchical "views" of source code information taken by requests, from the physical location of the source code and from the limitations of the file system structure generally.

Accordingly, the present invention provides a mechanism and process for managing source code files in file directory hierarchies in a file data processing system. A first hierarchy with at least one branch containing objects representing the physical location of the source code files is created, as are additional hierarchies having branches representing contextual views of items from the source code files. The items are references to individual source code files.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

User tasks or contexts can be described as a set of serial and/or parallel structure. In particular, a large number of contexts can be described by containment relationships. Containment relationships map very cleanly to hierarchical tree views with the root, or a top node, being the highest parent container.

Figure 1:
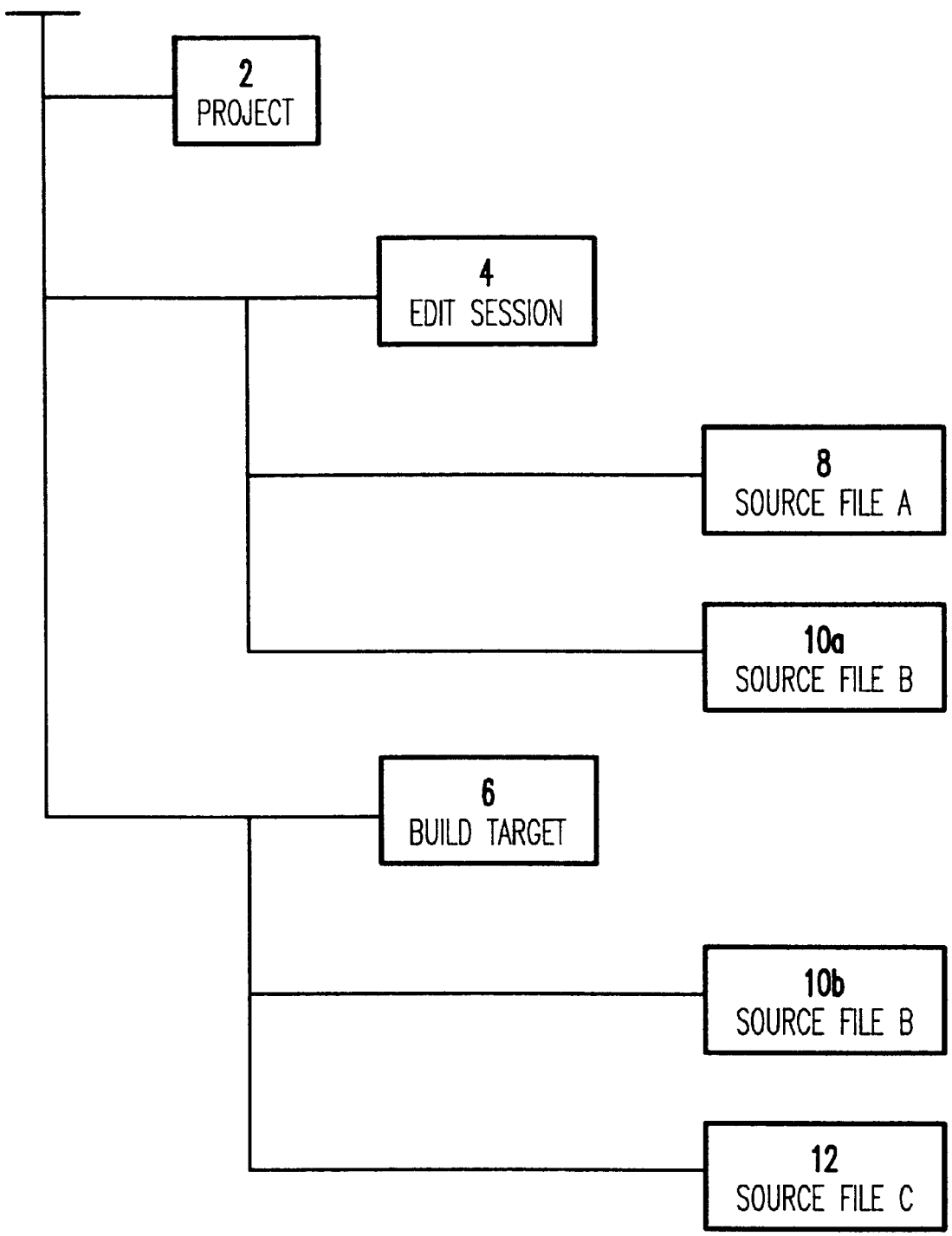
FIG. 1 is a simple multiple schematic view of file management.

FIG. 1 illustrates a schematic or tree view of a project 2 containing an edit session 4 and a build target or compilation unit 6. Each of these branches contains source files 8, 10 and 12 that are either being edited or compiled.

Source file B, generally designated as 10 appears twice, both under the edit session 4 and under the build target 6 branches. Depending on the nature of the user, this could mean that there are two copies of the file, or two references to a single copy. However, in the different contexts or branches of the tree, the meaning and use of the source in one context is different from, and frequently independent of, the other context.

Files are frequently copied in order to support different contexts or usage, and administration is put in place to manage the copying act. The hierarchical views group and manage the various contexts, so that a developer can discover, through inspecting the hierarchical views, that a file exists in different contexts.

Tools exist that support a presentation in which a file item in one context represents the real location of the file, while all other contextual representations of that file are merely references to its real location. Using the example set forth in FIG. 1, source files A 8 and B 10a could physically exist together in a directory for the edit session 4, and the representation of source file B 10b under the build target 6 would then indicate a reference to the physical location of the source file B in the directory tailored to the edit context.

Using a visual tool, the fact that source file B 10b under the build target 6 is a reference can be shown by colouring the line or node in the hierarchy in a contrasting colour, or with textual descriptive attributes of the line or target graphical node.

The value of hierarchies, then, is that they show objects in context and assist developers in managing the fact that an object may exist in many contexts. However, a main weakness of the hierarchies is that they are directly tied to physical locations. This means that administration is still required to deal with the physical location, with copying and with other functions associated with file system maintenance.

Tools currently in existence do permit some indirection in the views, but the views are still anchored in the physical locations. A useability issue that arises is that if colours are not used to differentiate between views of items representing actual physical locations and views of items representing references, it is never clear what a delete or update action means. That is, it is not clear whether deleting a view of an item will delete the physical source and thus all references to it, or merely a reference to a physical source file. The same concerns apply with respect to updating an original or a mirror copy of it.

The solution provided by the present invention is to cut the tie between the view or context and the physical location of the objects. Two separate containments are created, a logical view for all contextual views, and a physical view. This means that every item or object in a context can only have an indirect link to a physical location. All objects physically exist in only one location, and if a copy of an object is made, it is created as a new object.

Figure 2:
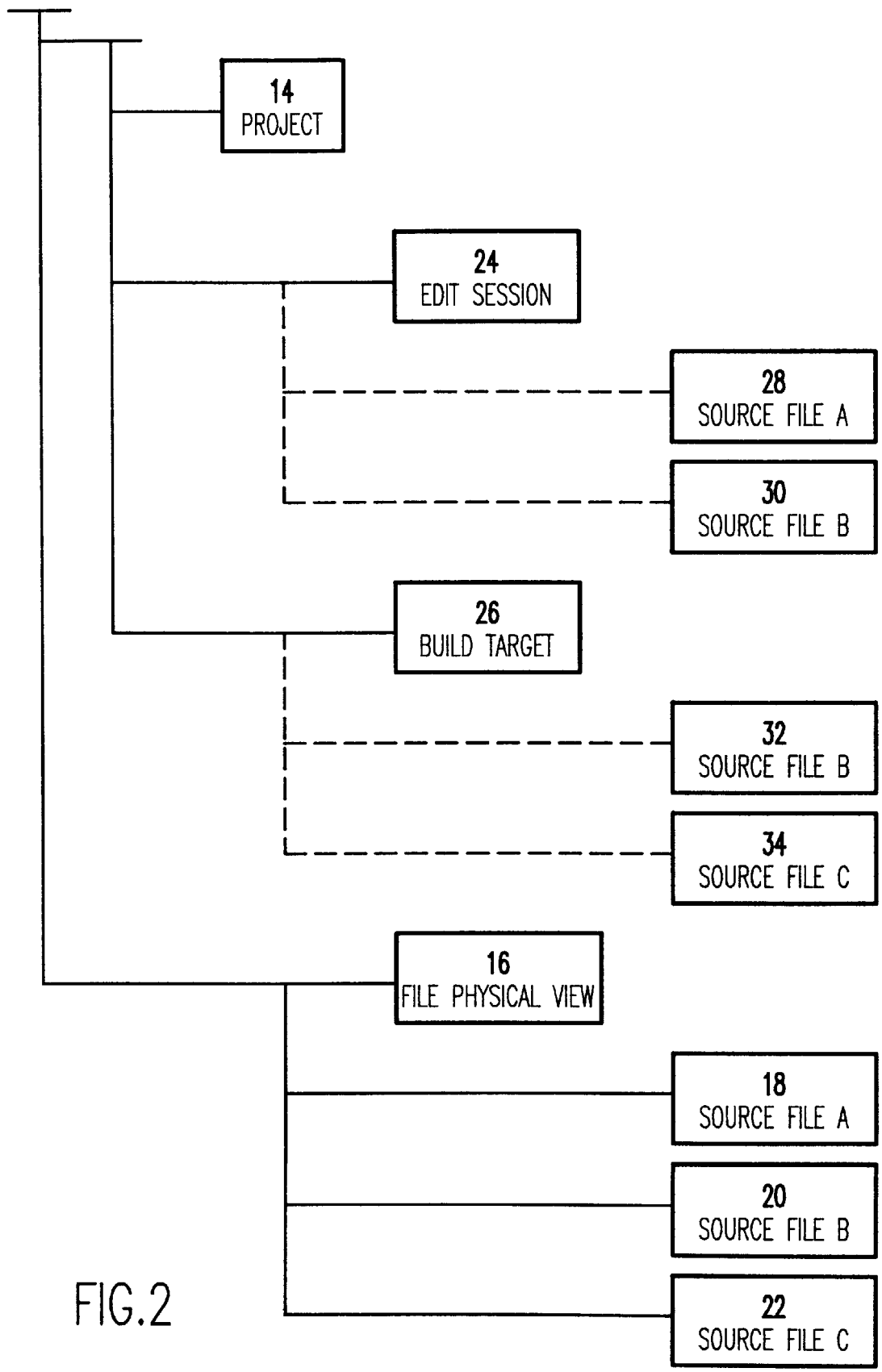
FIG. 2 is a hierarchy similar to FIG. 1, of context and physical views, arranged according to the invention.

This is illustrated schematically in FIG. 2. In this tree view, in addition to the Project 14 hierarchy, there is an independent hierarchy called File Physical View 16. File Physical View 16 and the tree source files A 18, B 20 and C 22 it contains, represent the physical location of the directory containing the actual source files.

The hierarchy of views under Project 14 represent pieces of the information required in the different task context of the edit session 24 and build target 26. The items or source files 28, 30, 32 and 34 listed in each view contain only indirect references to the corresponding real file objects 18, 20 and 22. This is shown by the broken lines linking these items to their respective context view roots. Thus, only a view becomes tailored to a particular context, rather than an underlying physical directory and location of the source file.

A single semantic can be applied to all visual references. For example, deletion or relocation of an item in a context view really modifies its reference to the physical location, rather than modifying the physical location of the actual source file.

The File Physical View 16 is constructed for explicit operations that deal with physical locations, such as copying and relocation.

The invention has been implemented in a tool builder framework having a metadata layering capacity to separate the information on logical views of the data in different contexts from the physical source code files. The aspects of this framework and metadata layering capacity are fully described in two concurrently filed application titles "An Object Oriented Framework Mechanism Providing Common Object Relationship and context Management For Multiple Tools" (IBM Docket No. CA997-002, Ser. No. 08/950,117, in pending) and "Hierarchical Metadata Store For An Integrated Development Environment" (IBM Docket No. CA997-003, Ser. No. 08/956,413, in pending), which are commonly assigned.

Figure 3:
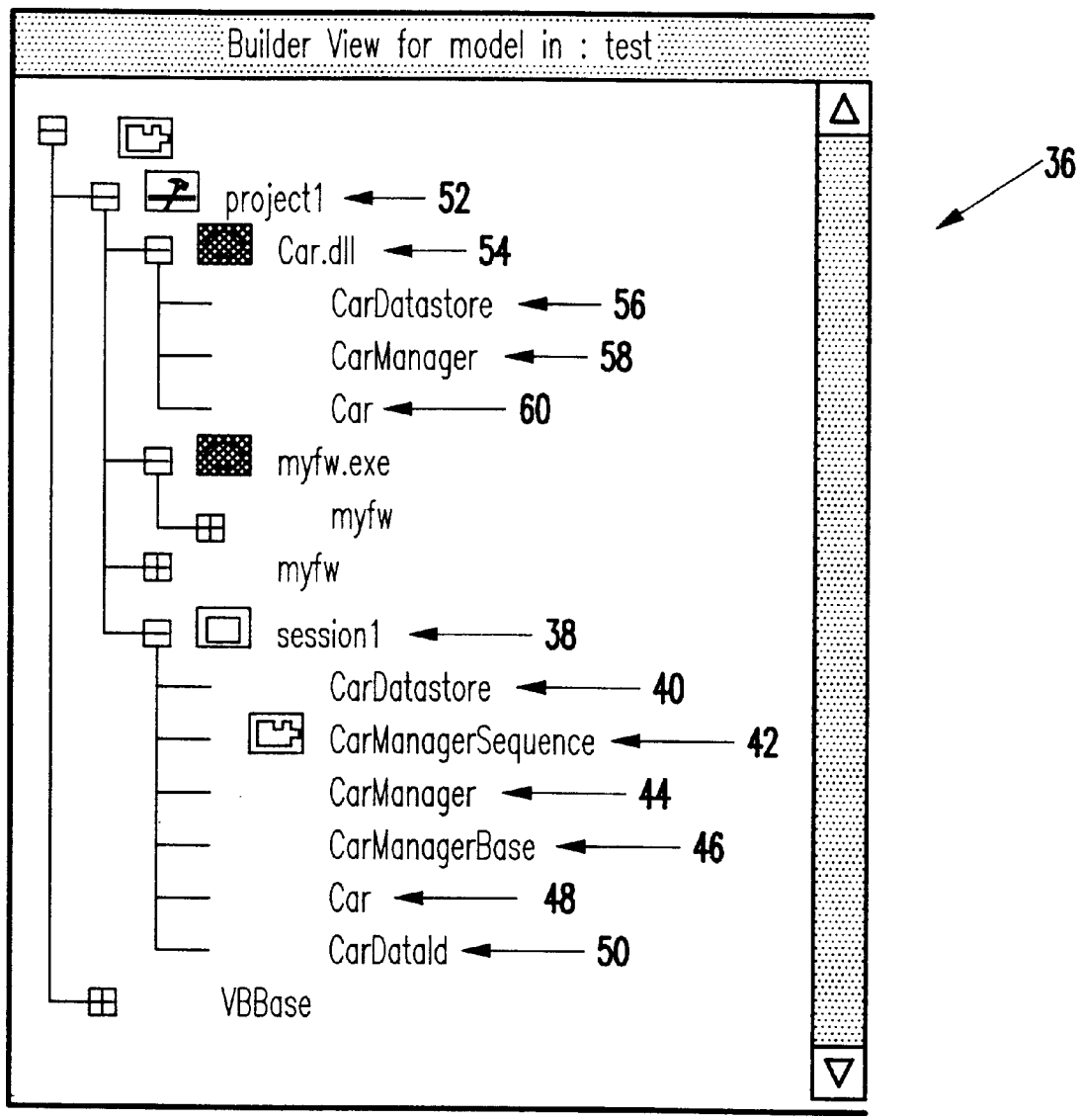
FIG. 3 is a window view showing the hierarchical context and physical views, according to a preferred embodiment of the invention.

FIG. 3 illustrates a window view of the software context management system according to a preferred implementation. In this window 36, Session1 38 is a visual representation of the hierarchy containing all of the physical source files with "car" data. These files include CarDatastore 40, CarManagerSequence 42, CarManager 44, CarManagerBase 46, Car 48 and CarDataId 50. A user can construct in a contextual Project1 directory 52, a compile unit in the form of a dynamic link library for a Car 54 containing specific attributes of the car data from the physical source files. The items in Car.dll 54 are references to the physical source code files. Therefore, the logical item CarDatastore 56 is a reference to the actual file CarDatastore 40, CarManager 58 a reference to CarManager 44 and Car 60 a reference to Car 48. Preferably, the logical items are visually indicated, for example, by the use of contrasting colour.

Embodiments and modifications of the invention that would be obvious to a person skilled in the art are intended to be covered within the scope of the appended claims.

We claim:

1. In a file data processing system, a mechanism for managing source code files in file directory hierarchies, comprising:

a first hierarchy having at least one branch containing objects representing a physical location of the source code files; and at least one additional hierarchy having branches representing contextual views of items from the source code files, each said item being a reference to an individual source code file physically located in accordance with said first hierarchy, wherein said at least one additional hierarchy has a tree structure independent of said first hierarchy.

2. A mechanism, according to claim 1, further comprising:

means for displaying said first hierarchy and said at least one additional hierarchy on a display associated with said file data processing system.

3. A mechanism, according to claim 2, wherein a user modification of an item displayed in one of said at least one additional hierarchies modifies the item's reference to an individual source code file, and a user modification of an object displayed in said first hierarchy modifies the object's physical source code file.

4. A mechanism, according to claim 3, wherein a user modification to copy a first object displayed in the first hierarchy creates a unique second object representing a physical copy of the first object's physical source code file.

5. In a file data processing system, a method for managing source code files in file directory hierarchies comprising:

maintaining a first hierarchy having at least one branch containing objects representing a physical location of the source code files; and creating at least one additional hierarchy having branches representing contextual views of items from the source code files, each said item being a reference to an individual source code file physically located in accordance with said first hierarchy, wherein said at least one additional hierarchy has a tree structure independent of said first hierarchy.

6. A method, according to claim 5, further comprising:

displaying said first hierarchy and said at least one additional hierarchy on a display associated with the file data processing system.

7. A method, according to claim 6, further comprising:

modifying a descriptive attribute of a reference to an individual source code file in response to a user modification of an item containing the reference in an additional hierarchy on the display.

8. A method, according to claim 6, further comprising:

modifying a physical source code file in response to a user modification of an object representing the physical source code file in the first hierarchy on the display.

9. A method, according to claim 8, wherein the user modification of the object is a copy function, further comprising:

creating a new object in the first hierarchy representing a physical copy made of a physical source code file.

* * * * *